June 2, 1970   G. E. UTZ   3,515,158
PURE FLUIDIC FLOW REGULATING SYSTEM
Filed Nov. 24, 1967   2 Sheets-Sheet 1

INVENTOR
GARY E. UTZ
Robert F. Gotella
BY
ATTORNEYS

United States Patent Office 3,515,158
Patented June 2, 1970

3,515,158
PURE FLUIDIC FLOW REGULATING SYSTEM
Gary E. Utz, Ferndale, Mich., assignor to the United States of America as represented by the Secretary of the Navy
Filed Nov. 24, 1967, Ser. No. 685,667
Int. Cl. F15c *1/16, 1/08*
U.S. Cl. 137—81.5                        7 Claims

ABSTRACT OF THE DISCLOSURE

A fluid flow limiting system includes an improved vortex amplifier controlled by a fluidic flip-flop. Pressure changes in the flow stream are sensed by a pressure sensor which changes the state of the flip-flop which introduces a control input to the vortex amplifier through which the flow stream passes. The output of the vortex amplifier will be limited and the flow rate in the system controlled.

---

The invention described herein may be manufactured and used by or for the Government of the United States of America for govermental purposes without the payment of any royalties thereon or therefor.

The vortex amplifier incorporates a baffle disk interposed in the vortex chamber for resolving the fluid input into a substantially radial flow pattern and an apertured ring for introducing the fluidic control input to achieve a uniform vortical flow pattern.

This invention relates to fluid control systems and more particularly to a flow limiting system utilizing a vortex amplifier controlled by a fluidic flip-flop.

BACKGROUND OF THE INVENTION

Fluid piping systems are often subject to malfunctions and ruptures caused by high pressure waves if valves are closed too rapidly. In certain environments, such as on board ships, particularly submarines, rupture of a main water pipe could result in extensive destruction of property and danger to life as a result of large quantities of water entering the vessel through the rupture. To a large extent, serious damage could be avoided by halting the flow of water by closing a valve in the pipeline upstream from the rupture before the mass of water entering the vessel has exceeded a tolerable amount. By controlling the flow of water through a burst pipe below a predetermined level sufficient time will be made available to close an upstream valve effectively.

Fluid flow control systems have been devised in the past, however, they suffer from various disadvantages. For instance, such systems would either interfere with the normal operation of the pipe system or not respond quickly enough to the large and sudden changes incurred in the event of a pipe rupture.

Accordingly, it is an object of the present invention to provide a flow limiting system which is capable of quickly and effectively controlling any quantity of fluid flow in the event of failure in the piping system.

Another object of this invention is to provide a fluid flow control system which requires no electrical or mechanical moving parts and which depends entirely on the flow of the fluid itself for operation.

A further object of this invention is to provide a fluid flow control system the operative components of which do not impede operation of the system under normal conditions but which can respond instantaneously to control fluid flow under abnormal conditions.

An additional object of this invention is to provide an improved vortex amplifier capable of producing a uniform vortical flow pattern and which requires no filtration or special operating conditions between the control fluid and mainstream pressures.

SUMMARY OF THE INVENTION

These and other objects are accomplished by providing an improved vortex amplifier through which the flowstream passes. A pressure sensor is connected to the output of the vortex amplifier for controlling the state of a fluidic flip-flop in response to significant pressure changes in the flowstream such as would be caused by a pipe rupture. The fluidic flip-flop is connected to the control input of the vortex amplifier which input is actuated in response to said pressure change thus controlling and limiting the mainstream flow through the vortex amplifier.

The full nature of the invention will be understood from the accompanying drawings and the following description and the claims.

BRIEF DESCRIPTION OF THE DRAWINGS

Referring to FIG. 1, the improved vortex amplifier 10 for use in the flow control system includes a base plate 11 having an aperture 12 formed therein. Mounted adjacently of base plate 11 is another plate 13 having an annular passageway or aperture 14 having a diameter substantially larger than that of aperture 12 and coaxial therewith. An annular ring 15 having a plurality of orifices formed in the wall thereof and having a smaller diameter than aperture 14 is axially disposed adjacent to base plate 11. A plate 16 having an aperture 19 substantially equal to the inner diameter of ring 15 is mounted adjacent to the said ring and plate 13. A top plate 17 having an aperture 18 coaxial with apertures 12 and 14 is mounted adjacent to plate 16. The configuration of plates 11, 13, 16 and 17, together with the corresponding apertures formed therein, provide a cavity 22 having a generally cylindrical configuration. A baffle disk 20 is mounted with cavity 22 by means of a plurality of spacers 21 connected to top plate 17. The upper edge of the disk 20 is preferably smoothly rounded for the purpose of streamlining fluid flow thereover.

Figure 1:
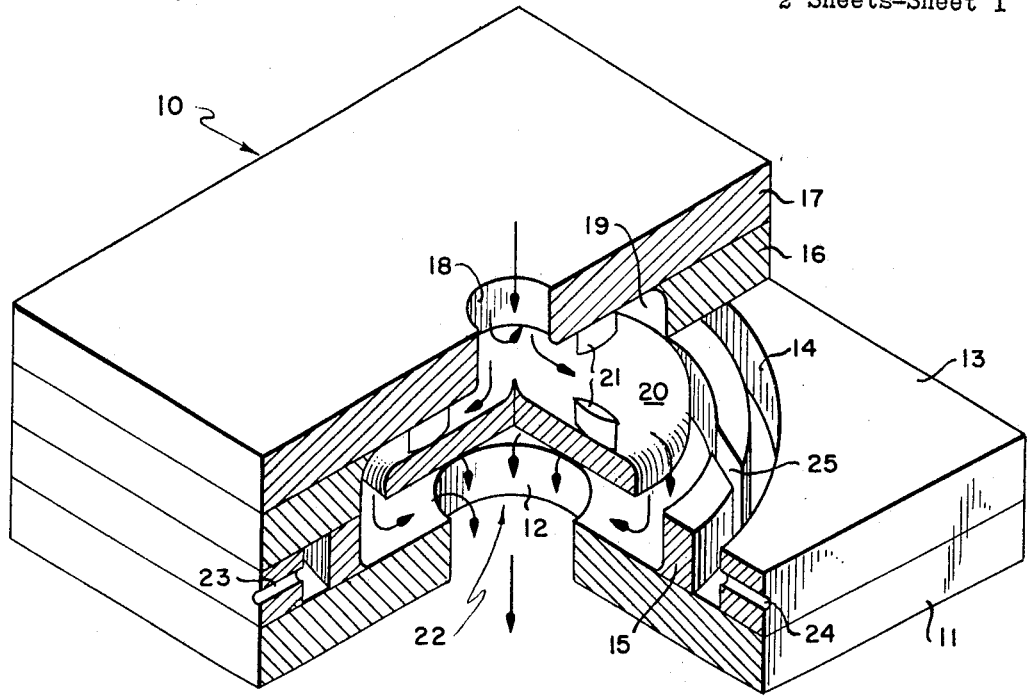
FIG. 1 is a sectional view of the improved vortex amplifier showing the fluid flow pattern with absence of a control input.

The ring 15 is provided with a plurality of slots 25 for allowing fluid communication between the inner and outer periphery of cylindrical cavity 22. Slots 25 are preferably skewed with respect to the radial lines of cavity 22. A plurality of orifices 23, 24 are provided in plate 13 for introducing a control jet of fluid into the cavity.

In operation, fluid under pressure is introduced through aperture 18 and flows, as indicated by the arrows, in a generally outwardly radial direction around disk 20 and radially inward through exit aperture 12. In this radial sink mode of operation there is no component of angular velocity and the flow of fluid is substantially unimpeded.

Figure 2:
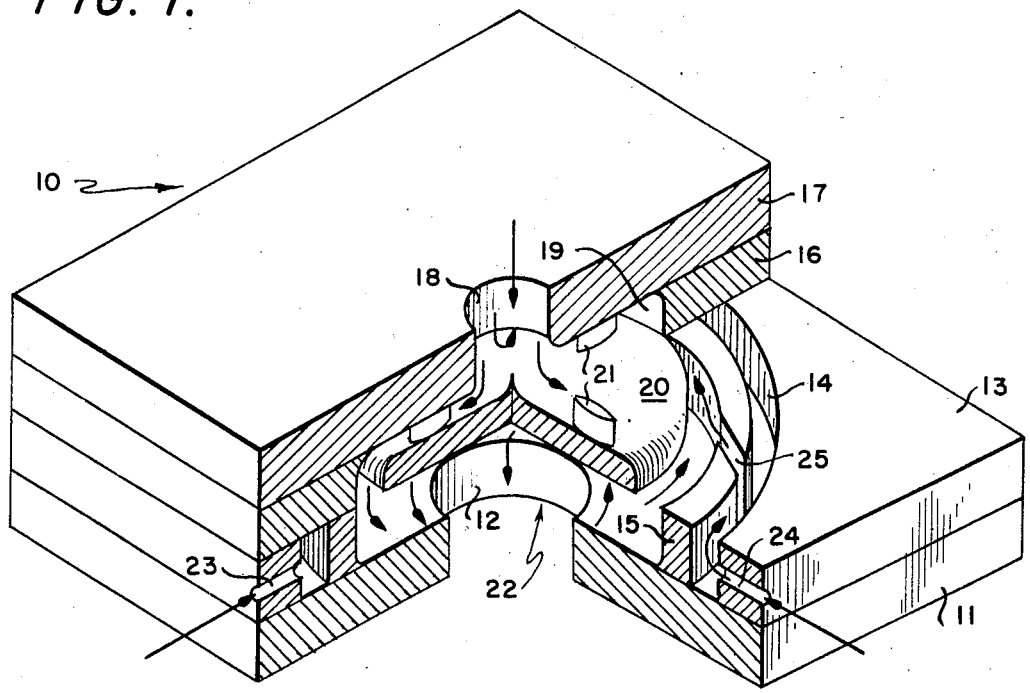
FIG. 2 is similar to FIG. 1 and shows the fluid flow pattern with the presence of a control input.

Referring to FIG. 2, there is shown the flow pattern of fluid through the vortex amplifier in the presence of a fluid control input applied through orifices 23, 24. The control fluid flows in the passage-way 14 and then to the interior region of cavity 22 through slots 25. Due to the orientation of slots 25, the control fluid will have a generally rotational component as it enters the cavity. This rotational flow will tend to disturb the generally radial flow described in connection with FIG. 1 and will cause the main flowstream within cavity 22 to assume a vortical configuration in the area between disk 20 and exit aperture 12. This vortex will create a back pressure within the main flowstream. Since the upstream pressure in the main pipe generally remains constant, the back pressure created by the vortex causes the pressure difference acting on the main flow to decrease thus regulating the total flow through the vortex amplifier.

Figure 3:
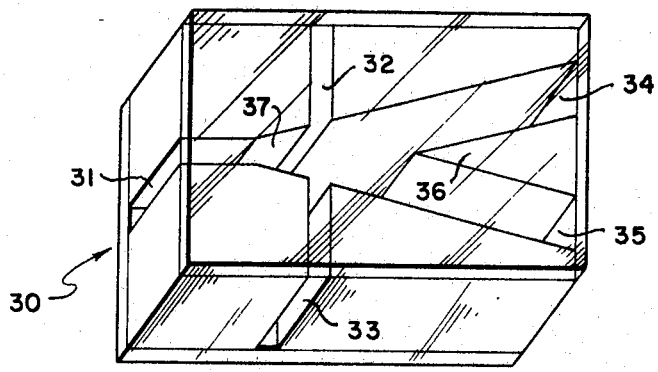
FIG. 3 is a plan view of a typical fluidic bistable flip-flop element.

FIG. 3 shows one embodiment, in perspective, of a fluidic flip-flop network 30 having two stables states. The flip-flop network 30 comprises a supply port 31 through which the main stream of fluid under presesure is introduced. As is well known in the art, the Coanda effect causes the fluid stream to attach itself to one of the walls of the flared jet portion 37 of the flip-flop and continue along this same path past the splitter portion 36 to either output port 34 or 35 until the fluid stream is disturbed. The state of flip-flop 30 may be switched by introducing a control jet of fluid under pressure into the appropriate control port 32 or 33. This will cause the fluid stream to detach itself from one wall and attach itself to the other wall and exit through the other output port. The fluid stream will continue to flow through the respective output even in the absence of a control jet input. The same result may be achieved by creating a fluid vacuum at the opposite one of the control ports.

Figure 4:
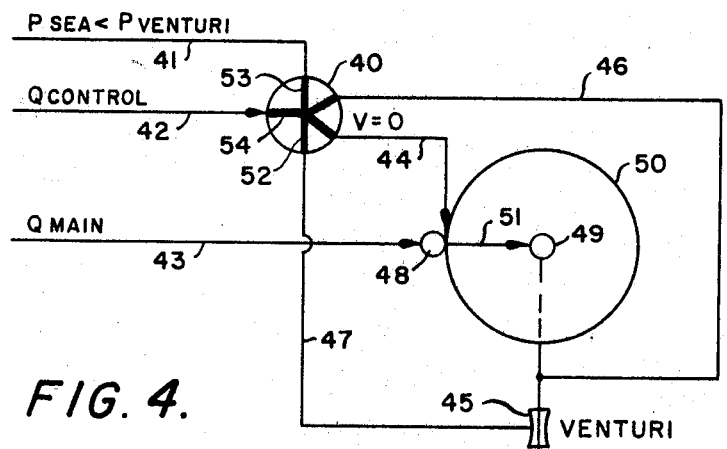
FIG. 4 is a schematic representation of the improved fluid flow control system in its normal operating condition.

FIG. 4 indicates schematically the connection and operation of the flow limiting system. The main flow stream of the fluid piping system 43 is fed through the input orifice 48 of the vortex amplifier 50 which may be of any well-known type, preferably of the design herein disclosed and exits through output orific 49. The output is fed through a venturi 45 the throat of which is provided with a bleed line 47 which is connected to control port 52 of flip-flop 40. The other control port 53 is connected through pipe 41 to the pressure head, for instance, sea water. The supply port 54 of flip-flop 40 is also connected through pipe 42 to the pressure head. One output 46 of the flip-flop is connected to bypass the vortex amplifier 50 while the other output 44 is connected to the control input of the vortex amplifier.

Under one set of conditions, the main flow of fluid through the piping system is fed through the vortex amplifier and passes through the venturi 5 where fluid flow across the throat portion establishes a certain pressure value in bleed line 47. Under such conditions the pressure in the venturi will be higher than the pressure head existing in pipe 41 and thus cause the input to the flip-flop to exit through output 46 and bypass the vortex amplifier 50. The main flow through the vortex will be undisturbed by the lack of flow at the control input thereof and will flow in a radial direction 51 as shown.

Figure 5:
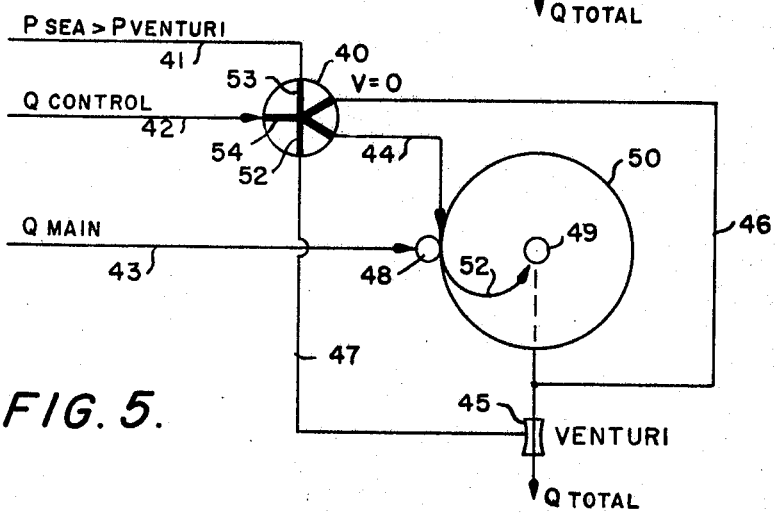
FIG. 5 is similar to FIG. 4 and shows the system in its control condition.

FIG. 5 shows the flow in the event of a pipe rupture or other malfunction causing appreciably increased fluid flow in the system. Under such circumstances the fluid velocity in venturi 45 will increase. The increase in fluid velocity will cause the throat pressure in the venturi to decrease which condition will be transmitted to control port 52 via pipe 47. Since the head pressure under this condition is higher than the throat pressure the flip-flop 40 will switch states and the fluid will exit through output 44 to the control input of the vortex amplifier 50. With the control input activated the main flowstream through the vortex amplifier will be disturbed and exhibit a vortical flow characteristic 52. Under such conditions the fluid output from the vortex amplifier will be limited and the flow rate throughout the piping system controlled.

Obviously many modifications and variations of the present invention are possible in the light of the above teachings. It is therefore to be understood that within the scope of the appended claims the invention may be practiced otherwise than as specifically described.

What is claimed is:
1. A pure fluidic flow regulating system comprising:
vortex amplifier means having a main fluid input, a main fluid output and a control fluid input;
pressure sensing means connected to said vortex amplifier means;
bistable fluid switch means having a fluid input, first and second control inputs and first and second outputs for controlling said vortex amplifier means;
said bistable fluid switch means being responsive to the pressure difference between the sensed pressure and a relatively constant pressure source within the system and activating said vortex amplifier means when said pressure difference reaches a predetermined value;
said fluid input and said first control input of said bistable fluid switch means being connected to said relatively constant pressure source;
said second control input of said bistable fluid switch means peing connected to said pressure sensing means;
said first output of said bistable fluid switch means being connected to said vortex amplifier control fluid input; and
said vortex amplifier means supporting fluid flow in a relatively unimpeded pattern before said bistable fluid switch means activates said vortex amplifier means and supporting fluid flow in an impeded pattern after said switching means activates said vortex amplifier means.

2. A pure fluidic flow regulating system as set forth in claim 1 wherein:
said switch comprises fluidic flip-flop means.

3. A pure fluidic flow regulating system as set forth in claim 2 wherein:
said pressure sensing means comprises venturi means.

4. A pure fluidic flow regulating system as set forth in claim 3 wherein:
the second output of said switch means is connected between the output of said vortex amplifier means and the input to said venturi means.

5. A pure fluidic flow regulating system as set forth in claim 4 wherein:
said second control input of said switch means is connected to the throat of said venturi means.

6. A pure fluidic flow regulating system as set forth in claim 5 wherein:
said vortex amplifier unimpeded flow pattern follows a radial sink configuration and said impeded flow pattern follows a vortical pattern.

7. A pure fluidic flow regulating system comprising a vortex amplifier including:
a housing defining a substantially cylindrical cavity within;
a fluid supply input orifice formed in said housing;
a fluid supply output orifice formed in said housing remote from said input orifice;
baffle means mounted within said cavity and between said input orifice and said output orifice for causing fluid injected through said input orifice to assume a radial flow pattern with respect to the axis of said substantially cylindrical cavity;
at least one control fluid input opening in fluid communication with said cavity;
a ring member within and spaced from said cavity periphery and having at least one aperture skewed with respect to said periphery of said cavity;
said cavity, input orifice, output orifice, baffle means and ring member all being substantially coaxial with each other;
whereby fluid flowing into said control fluid input will be guided through said aperture and will cause fluid flowing from said input orifice towards said output orifice to have a rotational velocity component within said cavity with respect to the injected fluid, thereby impeding fluid flow towards said output orifice.

References Cited

UNITED STATES PATENTS

| | | | |
|---|---|---|---|
| 3,193,197 | 7/1965 | Bauer | 137—81.5 XR |
| 3,232,095 | 2/1966 | Symnoski et al. | 137—81.5 XR |
| 3,267,946 | 8/1966 | Adams et al. | 137—81.5 |
| 3,395,720 | 8/1968 | Brooks | 137—81.5 |
| 3,351,080 | 11/1967 | Datwyler, et al. | 137—81.5 |
| 3,405,724 | 10/1968 | Goldschmied | 137—81.5 |
| 3,410,287 | 11/1968 | Van Der Heyden et al. 137—81.5 XR |
| 3,413,995 | 12/1968 | Bowles et al. | 137—81.5 |
| 3,444,878 | 5/1969 | Mayer | 137—81.5 |
| 3,324,891 | 6/1967 | Rhoades | 137—81.5 XR |

SAMUEL SCOTT, Primary Examiner